(12) United States Patent
Radovich (10) Patent No.: US 8,349,504 B1
(45) Date of Patent: Jan. 8, 2013

(54) ELECTRICITY, HEAT AND FUEL GENERATION SYSTEM USING FUEL CELL, BIOREACTOR AND TWIN-FLUID BED STEAM GASIFIER

(75) Inventor: Michael John Radovich, Plainsboro, NJ (US)

(73) Assignee: Michael John Radovich, Plainsboro, NJ (US)

( * ) Notice: Subject to any disclaimer, the term of this patent is extended or adjusted under 35 U.S.C. 154(b) by 458 days.

(21) Appl. No.: 12/661,735

(22) Filed: Mar. 23, 2010

Related U.S. Application Data (60) Provisional application No. 61/210,878, filed on Mar. 24, 2009.

(51) Int. Cl.
*H01M 8/06* (2006.01)

(52) U.S. Cl. .......................................... 429/426; 429/416

(58) Field of Classification Search .................. 429/426
See application file for complete search history.

(56) References Cited

U.S. PATENT DOCUMENTS

| | | |
|---|---|---|
| 4,143,515 A | 3/1979 | Johnsen |
| 4,341,069 A | 7/1982 | Bell et al. |
| 5,554,453 A | 9/1996 | Steinfeld et al. |
| 5,955,039 A | 9/1999 | Dowdy |
| 6,187,465 B1 * | 2/2001 | Galloway ...................... 429/410 |

OTHER PUBLICATIONS

U.S. Appl. No. 10/705,289, Radovich.
Jan H.J.S. Thijssen "Coal System Studies: Effects of Methane Content and High-Efficiency Catalytic Gasification".
Michael Radovich "The Radovich Cycle: A Novel MSW-Fired Heat Cycle" Power2009-81188, Proceedings of the ASME 2009 Power Conference Jul. 21-23, 2009, Alburquerque, New Mexico.

* cited by examiner

*Primary Examiner* — Patrick Joseph Ryan
*Assistant Examiner* — Brent Thomas (57) ABSTRACT

The process and system of the invention converts solid and liquid carbonaceous feedstock into electricity, steam, fuels, and carbon dioxide with minimal air emissions. Oxygen is partially consumed in a fuel cell then exhausted to a combustor of a Twin-Fluid Bed Steam Gasifier Unit (TFBSGU) where it is consumed in burning carbon contained in ash. After particulates are separated, the flue gas is expanded then cooled to recover power before returning to atmosphere or a bio-reactor. Synfuel leaving the TFBGSU is cooled in a heat recovery unit, producing steam and hot water. Carbon monoxide in this stream reacts with steam producing hydrogen and carbon dioxide. The stream is then cooled and compressed. The compressed gas passes through an acid gas removal system removing carbon dioxide and sulfur bearing compounds. Steam is added to the clean gas to prevent coking and the stream enters the anode space of the fuel cell.

15 Claims, 4 Drawing Sheets

ELECTRICITY, HEAT AND FUEL GENERATION SYSTEM USING FUEL CELL, BIOREACTOR AND TWIN-FLUID BED STEAM GASIFIER

CROSS REFERENCE TO RELATED APPLICATIONS

This application claims the benefit of PPA Ser. No. 61/210,878 filed Mar. 24, 2009 by the present inventor

FEDERALLY SPONSORED RESEARCH

Not Applicable

SEQUENCE LISTING OR PROGRAM

Not Applicable

BACKGROUND OF THE INVENTION

1. Field of Invention

This invention relates to the field of generating electricity, steam or hot water, chemicals and gaseous fuels from solid or liquid fuels. It also relates to the field of using photosynthesis to produce oxygen and algae from carbon dioxide and water.

2. Prior Art

Coal and other solid and liquid fuels have been gasified into more readily usable gaseous fuels for over one hundred years. In the most common reaction, the char-steam reaction, solid carbon reacts with steam to produce carbon monoxide and hydrogen. This reaction, being endothermic, requires heat and high temperatures to proceed. Traditionally, air was supplied to the fuel to partially burn the fuel and supply heat and temperature needed to drive the char-steam reaction.

Air-blown gasifiers (gasifiers using oxygen in air as an oxidizer for combustion) produce a low heat content fuel (synfuel) containing the nitrogen from the air. This fuel is burned with additional combustion air to produce heat. This fuel, and/or the combustion gases resulting after combustion, must be cleaned or treated to avoid air pollution. This is particularly difficult because of the high volumes of gas involved. The nitrogen in the air increases the volume of fuel gas that must be cleaned, and to reduce energy consumption of the air compressors, the gasification process proceeds at low pressures, which increases the specific volume of the fuel gas.

If an oxygen separation plant is used, oxygen rather than air is sent to the gasifier, which increases the heat content of the synfuel and reduces the volume of synfuel needed to be treated. Currently, this is the preferred configuration of coal or petcoke gasification projects: An IGCC (integrated Gasifier combined cycle) plant comprises one or more ASU (air separation units), oxygen blown gasifiers, combustion gas turbines with heat recovery steam generators and steam turbines. An example of this type of technology is disclosed and claimed in U.S. Pat. No. 4,341,069 (Bell et al.).

A third type of gasifier, the Twin-Fluidized Bed Steam Gasifier, uses steam to partially gasify the carbon-bearing fuel in a fluidized bed gasifier. Because steam does not supply enough heat for the gasification reactions, hot sand is also added to the gasifier. The cooled sand and residual ash from the carbon-bearing material is blown out of the gasifier and separated from the gas in a gasifier cyclone. This material drops into a fluidized bed combustor chamber, along with combustion air. The combustion air burns the residual carbon in the ash and reheats the sand. The ash and sand is removed from the flue gas in a cyclone. After separating the ash from the sand the sand returns to the gasifier.

This particular type of gasification has been used in the petrochemical industry to gasify petroleum coke for over fifty years as the Exxon Flexicoker process. A similar device for gasifying biomass has recently been developed by Battelle National Laboratories and has been commercially offered as the Silvagas process. A similar process has been offered by Taylor Biomass Industries. The advantage of this type of gasifier is that it produces high energy content fuel gases (gases with little nitrogen in them) without the expense of a air separation unit.

To further increase system efficiency, several recent designs incorporate fuel cells. Two different types of fuel cells have been considered in recent fuel cell-gasification patents: the Solid Oxide Fuel cell (SOFC), and the molten carbonate fuel cell (MCFC).

The SOFC uses a ceramic, solid-phase electrolyte operating at about 1830° F. Oxygen reacts with the cathode in the reaction:

$$O_2 + 4e^- \rightarrow 2O^=$$

The oxygen ions diffuse through the electrolyte and react with the fuel gas at the anode in the reactions:

$$H_2 + O^= \rightarrow H_2O + 2e^-$$

$$CO + O^= \rightarrow CO_2 + 2e^-$$

and $$CH_4 + 4O^= \rightarrow 2H_2O + CO_2 + 8e^-$$

The electrons travel from anode to cathode through an electric load, producing power. Because of the high temperatures, hydrocarbons in the fuel stream can also be reformed into hydrogen and carbon monoxide, if sufficient water vapor is available in the fuel stream.

The MCFC uses a molten carbonate salt mixture operating at about 1200° F. as an electrolyte. Oxygen and carbon dioxide reacts with the cathode in the reaction:

$$O_2 + 2CO_2 + 4e^- \rightarrow 2CO_3^=$$

The carbonate ions diffuse through the electrolyte and react with the fuel gas at the anode in the reactions:

$$H_2 + CO_3^= \rightarrow H_2O + CO_2 + 2e^-$$

and $$CO + CO_3^= \rightarrow 2CO_2 + 2e^-$$

As with the SOFC, the electrons travel from anode to cathode through an electric load, producing power. Because of the high temperatures. hydrocarbons in the fuel stream can also be reformed into hydrogen and carbon monoxide, if sufficient water vapor is available in the fuel stream. Unlike the SOFC, the oxidant stream must contain carbon dioxide, which must be recovered from the system.

Because both the SOFC and MCFC reaction products accumulate in the anode, fuel cannot be completely consumed in the anode; eventually, the reaction products dilute the concentration of fuel enough so that the fuel cell potential decreases below economically recoverable voltages. At that point, the remaining fuel is generally burned in an external combustor to produce heat that pre-heats the gases entering the fuel cell. The heat can also be used to produce steam to produce additional power or heat.

One example of a SOFC gasification technology is disclosed and claimed in U.S. Pat. No. 5,955,039 (Dowdy), which is incorporated by reference herein in its entirety. In this invention the compressor section of a gas turbine provides pressurized air to both a fuel cell and to a Gasifier. A portion of the oxygen in the air entering the fuel cell reacts with the cathode to produce water, and this vitiated air stream then enters a combustor, where it reacts with fuel leaving the Gasifier. The other portion of the compressed air enters the Gasifier where it reacts with fuel to form hydrocarbons, carbon monoxide and hydrogen. After cleaning and phase shifting some of the carbon monoxide to hydrogen, some of the hydrogen is sent to the fuel cell and the remainder of the gas is burned in the combustor. This reaction produces a hot, pressurized gas stream which drives the turbine section of the gas turbine. One disadvantage with this prior art is that the Nitrogen in the exhaust forms NOx when it is combusted. A second disadvantage is that the nitrogen adds volume to the gas leaving the Gasifier, increasing the expense in cleaning it.

Another example of an prior art, suitable for both SOFC and MCFC equipment is disclosed and claimed in U.S. Pat. No. 6,187,465 (Galloway), which is incorporated by reference herein in its entirety. The all embodiments of this patent feed the fuel cell cathode exhaust to the Gasifier after removing the water from the stream. This arrangement has the disadvantage of requiring a separate oxygen supply to the Gasifier.

Another example of a prior art, is disclosed and claimed in U.S. Pat. No. 5,554,453 (Steinfeld), which is incorporated by reference herein in its entirety. This patent recycles a portion of the Gasifier exhaust back to the Gasifier, supplying the heat needed for gasification by heating this stream with an exhaust stream formed by burning the exhaust of a MCFC with air. This patent requires an extremely high temperature heat exchanger to supply the gasification heat.

The prior art referenced above all produce significant volumes of exhaust to the atmosphere, which must be further cleaned. They also require cooling or heating of streams entering the Gasifier, reducing gasification efficiency. They did not make use of the hot oxygen leaving the fuel cell in the Gasifier.

One example of a prior art is disclosed and claimed in U.S. Pat. No. 4,143,515 (Johnsen) which is incorporated by reference herein in its entirety. This patent did allow oxygen leaving the fuel cell to be directly used in the Gasifier. However, the oxygen and hydrogen used in the fuel cell were generated electrically from water using electrical power.

Another example of prior art is disclosed and claimed in patent application Ser. No. 10/705,289 (Radovich), which is incorporated by reference in its entirety. This patent combines the streams from the anode and cathode into a single gasifier, rather then directing these streams to separate gasifiers and combustors.

A final example of a prior art is disclosed as a Power Point presentation entitled "Coal System Studies: Effects of Methane Content and High-Efficiency Catalytic Gasification" attached to this application. This presentation describes a thermal cycle with the anode exhaust directly connected to a catalytic gasifier. The exhaust from the cathode is directly connected to a turbo-expander.

OBJECTS AND ADVANTAGES

Accordingly, several objects and advantages of my invention are:
(a) to avoid significant exhausts containing pollution
(b) to avoid use of an oxygen blown Gasifier which reduces the capital cost and auxiliary load associated with an Air Separation Unit.
(c) To increase process efficiency by directly utilizing the high temperature waste heat produced by the fuel cell in a gasifier without using high temperature heat exchangers.
(d) To produce an electrical generation process with highest efficiencies at minimum output, allowing competitive operation during periods of low electrical demand.
(e) To recycle unreacted hydrogen leaving the fuel cell back to the fuel cell, so that it can all be consumed in a high efficiency fuel cell rather than a low efficiency combustor.

Other objects and advantages are:
(f) to minimize the use of high temperature rotating machinery which reduces capital costs.
(g) to increase the efficiency of the fuel cell by increasing pressure, temperature and oxygen concentration in the cathode and temperature, pressure and hydrogen concentration at the anode. As this design does not utilize a gas turbine, gas pressures in the SOFC are not limited by the design pressure of the CTG combustor.
(h) to design a power plant which releases the carbon dioxide in a purified concentrated stream, which is easily sequestered
(i) Consuming the carbon dioxide produced in the process in a bioreactor to produce oxygen, which is recycled back to the process.

Further objects and advantages of my invention will become apparent from a consideration of the drawings and ensuing description.

SUMMARY

The process and system of the invention converts solid and liquid carbonaceous feedstock into electricity, steam, hydrogen and other fuels, and carbon dioxide with minimal air emissions. The present process comprises the following steps:
(a) Compressing ambient air, oxygen from an oxygen plant, or exhaust from a photo-bioreactor to create an oxidizer stream;
(b) adding carbon dioxide to the oxidizer stream, if necessary for the operation of the fuel cell;
(c) heating the oxidizer stream as necessary to maintain fuel cell temperature before it enters the cathode space of a fuel cell;
(d) Reacting the oxygen and carbon dioxide of the oxidizer stream (for a MCFC) or oxygen of the oxidizer stream (for a SOFC) with electrons on the cathode surface to form ions that diffuses across the fuel cell electrolyte towards the fuel cell anode;
(e) Sending the remaining oxidizer stream directly from the exhaust of the fuel cell cathode space to the combustor inlet of a Twin fluid-bed steam gasification unit (TFBSGU);
(f) Passing treated synfuel gas into the anode space of the fuel cell, where methane and other hydrocarbons react with steam to form carbon monoxide and hydrogen, and carbon monoxide reacts with steam to form carbon dioxide and hydrogen;
(g) Reacting the resulting hydrogen in the fuel stream with the electrolytes on the anode, producing electrons which gas through a dc generator to produce power, and carbon dioxide and steam;
(h) As an optional step, recycling a portion of the anode space exhaust back to the inlet of the anode to increase hydrogen conversion and supply de-coking steam to the anode space;

(i) Sending the remainder of the anode space exhaust directly to an inlet of a gasifier of a Twin fluid-Bed Steam Gasification Unit (TFBSGU);

(j) pumping solid or liquid carbonaceous feedstock into TFBSGU Gasifier, where it is heated by hot sand and partially reacts with hydrogen and steam to form gaseous fuel products;

(k) blowing the resulting cooled sand, char ash, and synfuel to a gasifier cyclone, where the solids (sand, char, and ash) drop out of the synfuel stream;

(l) draining the solids leaving the gasifier cyclone into the TFBSGU combustor, where the carbon in the char reacts with the oxygen in the oxidizer stream to form heat and carbon dioxide, and heat the other solids entering the combustor;

(m) blowing the resulting hot sand, ash and flue gas to a combustor cyclone, where the solids (sand and ash) drop out of the stream;

(n) separating the ash from the sand and removing it from the cycle, while draining the hot sand back to the gasifier;

(o) as an optional step, cooling then expanding the flue gas in a turbo-expander to produce electrical power;

(p) further cooling and treating the flue gas before exhausting to atmosphere or to a photo-bioreactor;

(q) cleaning and partially cooling the gaseous fuel product leaving the Gasifier;

(r) As an optional step, expanding the gaseous product leaving the gasifier to produce electrical power;

(s) as an optional step converting carbon monoxide and steam in the synfuel gas to hydrogen and carbon dioxide by passing the gas through a catalyst bed;

(t) As an optional step, passing the gas through a pollutant control system to remove particulate, salts and other pollutants;

(u) further cooling the syngas to remove temperature and moisture and to produce steam and hot water used to produce electricity and thermal energy;

(v) compressing the remaining syngas through a syngas compressor, then cooling it before it enters a acid gas removal system;

(w) removing the carbon dioxide and sulfur-bearing compounds from the fuel product, further separating the sulfur from the carbon dioxide and sequestering the carbon dioxide or exhausting it to the atmosphere;

(x) adjusting the composition of the fuel stream to optimize fuel cell operation or the production of synthetic fuel (this generally involves removing hydrogen from the stream or adding steam to prevent carbon coking in the fuel cells);

(y) returning the treated fuel stream to the anode space;

(z) producing steam and hot water from a portion of the heat removed from the cycle, using a portion of the steam to generate electricity through a steam turbine generator;

(aa) removing the residual heat of the system in a heat rejection system, preferably a cooling water system.

The present invention has four fundamental features:
1. The anode space exhaust is directly connected to the TFBSGU gasifier inlet.
2. The cathode space exhaust is directly connected to the TFBSGU combustor inlet.
3. Gas leaving the gasifier is treated, with at least a portion of it returning to the anode space inlet.
4. The fuel gas stream and the oxidizer stream do not mix.

| DRAWINGS-REFERENCE NUMERALS | |
|---|---|
| 1 | Fuel Gas Supply Line |
| 2 | Fuel Gas Export Line |
| 3 | De-coking Steam Line |
| 4 | Fuel Gas Pre-Heater |
| 5 | Molten Carbonate Fuel Cell |
| 6 | Fuel Cell Anode Compartment |
| 7 | Fuel Cell Anode |
| 8 | Oxidizer Supply Line |
| 9 | Oxidizer Pre-Heater |
| 10 | Fuel Cell Cathode Compartment |
| 11 | Fuel Cell Cathode |
| 12 | Fuel Cell Electrolyte |
| 13 | Combustor Oxidizer Supply Line |
| 14 | Fuel Cell DC Leads |
| 15 | Rectifier/Power Conditioning System |
| 19 | Gasifier Steam Supply Line |
| 20 | Gasifier |
| 21 | Fuel Feed Line |
| 22 | Combustor Seal Leg |
| 23 | Gasifier Exhaust Line |
| 24 | Gasifier Cyclone Separator |
| 25 | Gasifier Seal Leg |
| 26 | Hot Syngas Line |
| 27 | Syngas Shift and Cooling Apparatus |

-continued

DRAWINGS-REFERENCE NUMERALS

| | |
|---|---|
| 28 | Syngas Condensate Line |
| 29 | Supplementary Gas Line |
| 30 | Combustor |
| 31 | Combustor Exhaust Line |
| 32 | Combustor Cyclone Separator |
| 33 | Ash Removal Leg |
| 34 | Hot Flue Gas Line |
| 35 | Flue Gas Cooling Apparatus |
| 36 | Air Separation Unit |
| 37 | Flue Gas Compressor |
| 38 | Flue Gas Return Line |
| 40 | Syngas Compressor |
| 41 | Compressed Syngas Cooler |
| 42 | Acid Gas Removal System |
| 43 | Carbon Dioxide Line |
| 44 | Carbon Dioxide Compressor |
| 45 | Carbon Dioxide Export Line |
| 46 | Sulfur Removal Line |
| 47 | Photo-Bioreactor |
| 48 | Algae Supply Line |
| 49 | Carbon Dioxide Recycle Line |
| 50 | Bioreactor Compressor |
| 51 | Oxygen Accumulator |
| 52 | Carbon Dioxide Bypass Line |
| 53 | Bioreactor Gas Forwarding Line |
| 101 | Flue Gas Expander |
| 102 | Air Pre heater |
| 103 | Flue Gas Heat Recovery Unit |
| 104 | Stack |
| 105 | Air Inlet |
| 106 | Air Compressor |
| 110 | Solid Oxide Fuel Cell |
| 201 | Hydrogen Removal Unit |
| 202 | Hydrogen Feed Line |
| 203 | Tail Gas Compressor |
| 204 | Hydrino Boiler |
| 205 | Feedwater Supply Line |
| 206 | Syngas Economizer |
| 207 | Syngas Superheater |
| 208 | Steam Supply Line |

DETAILED DESCRIPTION—PREFERRED EMBODIMENT (DUAL LOOP MOLTEN CARBONATE FUEL CELL)

Figure 1:
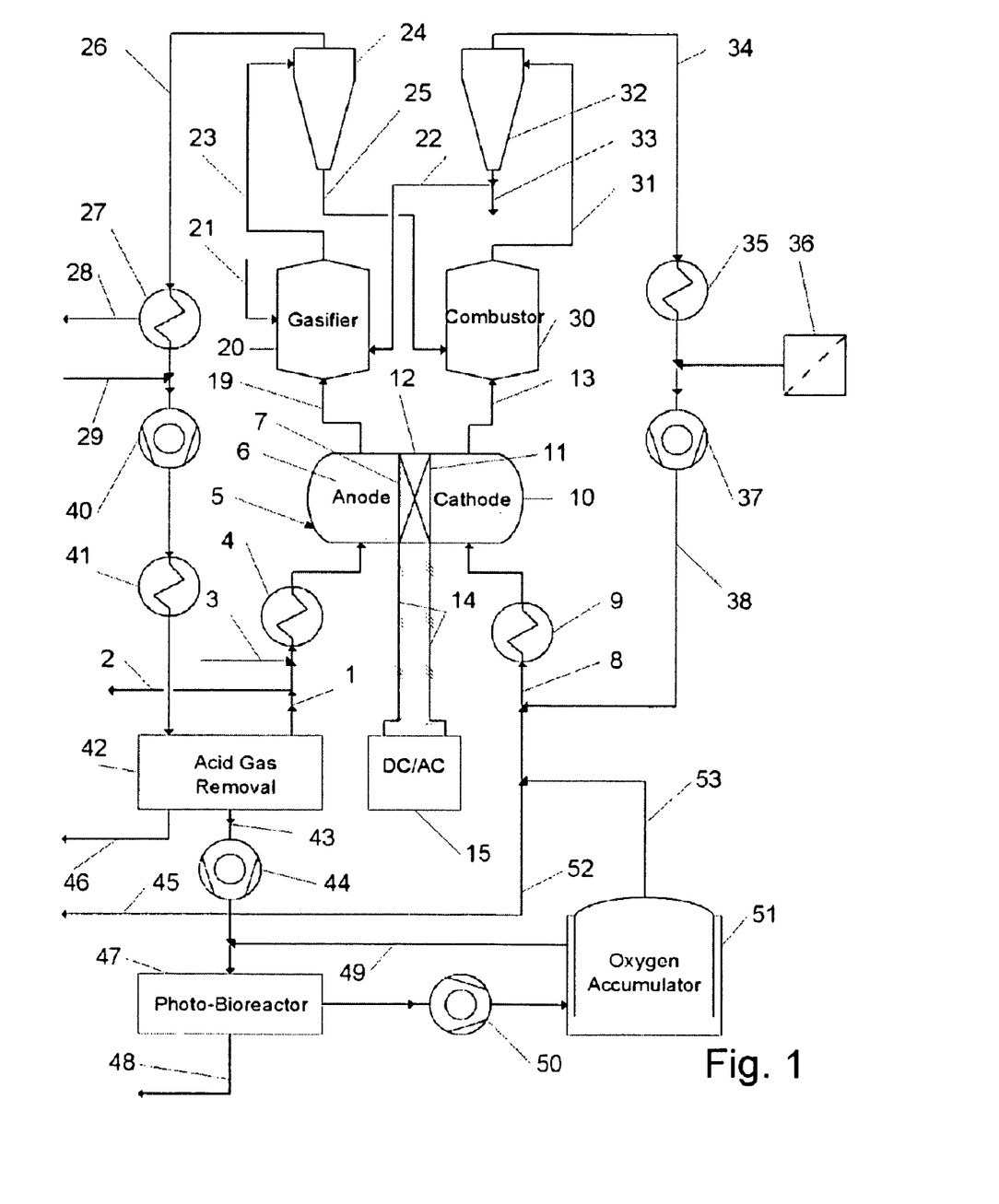
FIG. 1 is a schematic process flow diagram of the first embodiment of the process and system of the present invention. This is a dual loop process utilizing a MCFC exhausting to a twin-fluid bed steam gasifier. In this design, some of the carbon dioxide removed from the fuel gas produced in the gasifier is sent to the photo-bioreactor where it produces enough oxygen to supply the fuel cell and oxidizer. Oxygen can also be supplied by a supplemental oxygen plant.

A preferred embodiment of the system is shown in FIG. 1. After removing most of the carbon dioxide and hydrogen sulfide in an acid gas removal system, 42, synthetic fuel gas leaves the gas removal system through the fuel gas supply line 1. After removing a portion of the gas for external consumption through a Fuel Gas Export Line 2, steam is added to the remaining fuel through a De-coking Steam Line 3 to prevent coking (carbon plating) on upstream equipment. If necessary, fuel can be heated in a Fuel Gas Pre-heater 4 to maintain the operating temperature of the Molten Carbonate Fuel Cell (MCFC) Assembly 5. In this assembly, fuel in the Fuel Cell Anode Compartment 6 reacts with carbonate ions to form carbon dioxide and steam and electrons. Because of the high temperatures of the fuel cell, hydrocarbons in the fuel can be reformed, to produce carbon monoxide, then phase shifted to produce additional hydrogen using the following reaction:

$$CO + H_2O \rightarrow CO_2 + H_2$$

Steam required by the reaction is provided by the water vapor produced by the anode or steam entering the anode compartment with the fuel. The electrons travel through an external circuit 14 to produce AC power in a rectifier/AC power conditioning system 15 before reacting with carbon dioxide and oxygen in the cathode compartment 10 to form carbonate ion. The ions then diffuse through the electrolyte 12 to the anode and continue the reaction.

The remaining fuel, along with the carbon dioxide and steam produced in the fuel cell, enters the gasifier 20 at approximately 1200° F. through a gasifier steam supply line 19. There it reacts with Municipal Solid waste or other carbonaceous bearing material fed to the gasifier through the Fuel Feed Line 21. Carbonaceous material, steam, hydrogen, carbon dioxide, and hydrocarbons react in the Gasifier 20 in the following principal reactions:

| | |
|---|---|
| $C + 2H_2 \rightarrow CH_4$ | (hydrogasification) |
| $C + H_2O \rightarrow CO + H_2$ | (Steam-carbon) |
| $C + 2CO_2 \rightarrow 2CO$ | (Boudouard) |
| $CH_4 + H_2O \rightarrow 3H_2 + CO$ | (Methane-steam reforming) |

Some of the heat needed to drive these reactions is provided by hot sand or other bed material draining into the gasifier through the combustor seal leg 22. Ash, cooled sand, and gaseous products leave the gasifier through the Gasifier Exhaust Line 23, and enter the Gasifier Cyclone 24. There, the sand and ash are separated from the gas by centrifugal action or other means. Solids settle into the bottom of the cyclone and fall through a gasifier seal leg 25, while the cleaned gas leaves the cyclone through the hot syngas line 26 at approximately 1800° F.

The sand and ash enter the combustor 30 and reacts with the oxidizer stream leaving the fuel cell cathode compartment 10 through the combustor oxidizer supply line 13. There the carbon in the ash reacts with a portion of the oxygen remaining in the oxidizer stream to form carbon dioxide and heat. The resulting and heated solids are then blown out of the combustor through the Combustor Exhaust Line 31 into the Combustor Cyclone Separator 32. The heated sand and ash fall into the bottom of the cyclone and then are separated, the sand returning to the combustor seal leg 22, while the ash is removed through the ash removal leg 33.

Elements 20 through 25 and 30 through 33 comprise a Twin Fluid-Bed Steam Gasification System. These systems are prior art, and are commercially available as the Exxon Flexicoker process, for gasifying petroleum coke or the Silvagas Process, for gasifying biomass.

Crude syngas leaving the gasifier cyclone separator enters the Syngas shift and cooling apparatus 27. This apparatus filters and cools the gas to recover usable heat to produce steam and/or hot water. This apparatus can also be designed as a "sour or dirty shift" process. In this process, steam reacts with most of the carbon monoxide in the presence of a catalyst to form carbon dioxide and hydrogen. The sour or dirty term refers to the sulfur compounds in the gas stream, which are required by the catalyst. To reduce the load on the downstream Syngas Compressor 40, the apparatus will generally cool the gas as cold as possible and condense as much of the steam in the fuel as possible. This condensate leaves the apparatus through the syngas condensate line 28.

Other gas streams containing carbon dioxide and hydrocarbons can be introduced after or within the shift and cooling apparatus 27 though Supplementary Gas Line 29. These streams can be obtained from anaerobic digesters, or vents from pressure swing adsorption units designed to remove methane and hydrogen sulfide from air vented from feedlot operations.

The fuel gas is then compressed in a Synfuel Compressor 40 and cooled in a Compressed Syngas Cooler 41 before entering an Acid Gas Removal System 42. This system is composed of two different sub-systems. The first sub-system removes the carbon dioxide and sulfur compounds from the fuel gas and sends it to the second sub-system. The second sub-system removes the sulfur compounds from the carbon dioxide gas stream and reduces it to elemental sulfur, which is then removed through the Sulfur Removal Line 46.

A large number of commercially available processes can be used in the first sub-system. Most are based on one or more of the following chemical principles:

Physical or chemical absorption of carbon dioxide and sulfur compounds into a liquid solvent with a subsequent desorption step.

Physical or chemical adsorption onto the surface of a solid particle with a subsequent de-adsorption through changing the temperature or pressure in the vessel containing the solids Diffusion through a permeable or semi-permeable membrane; Carbon dioxide and sulfur compounds can separated from the fuel either by passing through the membrane leaving the fuel gas behind, or passing the fuel through the membrane and leaving the carbon dioxide and sulfur compounds behind.

Chemical conversion, generally on a catalyst, often as a preparatory step to one of the other methods.

In this embodiment, the Sulfinol process, a commercially available absorption process offered by Shell was selected for the sub-system. In this process, carbon dioxide and sulfur compounds are absorped into a sulfinol solvent trickling down a packing tower. The solvent is then heated with a steam heater and depressurized to release the carbon dioxide and sulfur compounds into the second sub-system. The lean solvent is then pumped then cooled before returning to the packing tower.

A large number of commercially available processes can be used in the second sub-system. In this embodiment, the Lo-Cat process, commercially available oxidative wash process offered by Merichem, was selected. In this process, sulfur compounds traveling up a packing tower reacts with an aqueous chelated iron solution trickling down the tower to form elemental sulfur. The solution is then pumped into an oxidation vessel, where the solution is regenerated by blowing air into the tank and the sulfur drops out of solution and is removed.

The clean carbon dioxide is then leaves system 42 through the Carbon Dioxide Line 43. If necessary, the carbon dioxide leaving the acid gas removal system 42 is pressurized by a Carbon Dioxide Compressor 44 and is either sent off-site, for sequestration through the Carbon Dioxide Export Line 45; sent to the Photo-Bioreactor 47; or sent through the Carbon Dioxide Bypass Line 52 to maintain a molal ratio of two parts carbon dioxide to one part oxygen in the oxidizer stream.

The photo-bioreactor 47 is filled with water containing algae in transparent vessels allowing sunlight to enter. When exposed to sunlight algae photo synthetically absorbs carbon dioxide and forms carbohydrates and other hydrocarbons (by creating additional algae) while emitting oxygen. Suitable photo bioreactors for the present invention are disclosed in U.S. Pat. application 20090011492 Berzin. Surplus algae leave the photo-bioreactor 47 through Algae Supply Line 48.

Oxygen formed in the photo-bioreactor and residual carbon dioxide leaves the photo-bioreactor is pressurized by the Bioreactor Exhaust Compressor 50. Gas leaving this compressor is recycled to the photo-bioreactor through Carbon Dioxide Recycle Line 49; stored in an Oxygen Accumulator 51; or mixed in the oxidizer stream after passing through the Bioreactor Gas Forwarding Line 53. Gas is recycled back to the Photo-Bioreactor either to increase the proportion of oxygen in the mixture, or to supply oxygen when the rate of photosynthesis decreases and the algae begin to absorb oxygen. The Oxygen Accumulator 51 is a commercially available storage vessel. Surplus oxygen produced during the day is stored in this tank and withdrawn during the night.

The production of oxygen through photosynthesis is an optional feature of this invention. If it is not used, items 47 through 51 and 53 are deleted.

Carbon dioxide not consumed by photosynthesis and oxygen produced through photosynthesis eventually are blended with flue gas leaving the combustor cyclone separator 32 in the Oxidizer Supply Line 8. Before blending, the flue gas is cooled and filtered in the Flue Gas Cooling Apparatus 35 and pressurized by the Flue Gas Compressor 37. Any supplementary oxygen required by the cathode and combustor is supplied through an Air Separation Unit 36 which produces pure oxygen from ambient air. Pressurized flue gas travels through the Flue Gas Return Line 38 and mixes with the gases from the acid gas removal system and/or photo-bioreactor before entering the Oxidizer Supply Line 8. The oxidizer stream is heated in the Oxidizer Pre-heater 9 as necessary to maintain operating temperature in the MCFC. The heated oxidizer stream then enters the Cathode Compartment 10 of the Fuel Cell Assembly 5.

Because this particular embodiment uses oxygen produced in photo-bioreactors or air separation units, it does not have a significant emission source. The molten carbonate fuel cell performs several different tasks. First, it produces and pre-heats steam needed by the by the gasifier. Second it utilizes waste heat produced by the fuel cell to reform methane into carbon monoxide and hydrogen. Third, the anode also functions as a shift reactor, converting carbon monoxide and steam to carbon dioxide and hydrogen. Fourth, it pre-heats the combustion air needed by the combustor. Fifth, it removes carbon dioxide produced in the combustor into the fuel stream, where it can be removed by the acid gas removal system.

DETAILED DESCRIPTION—ADDITIONAL EMBODIMENT (AIR-BLOWN SOLID OXIDE FUEL CELL)

Figure 2:
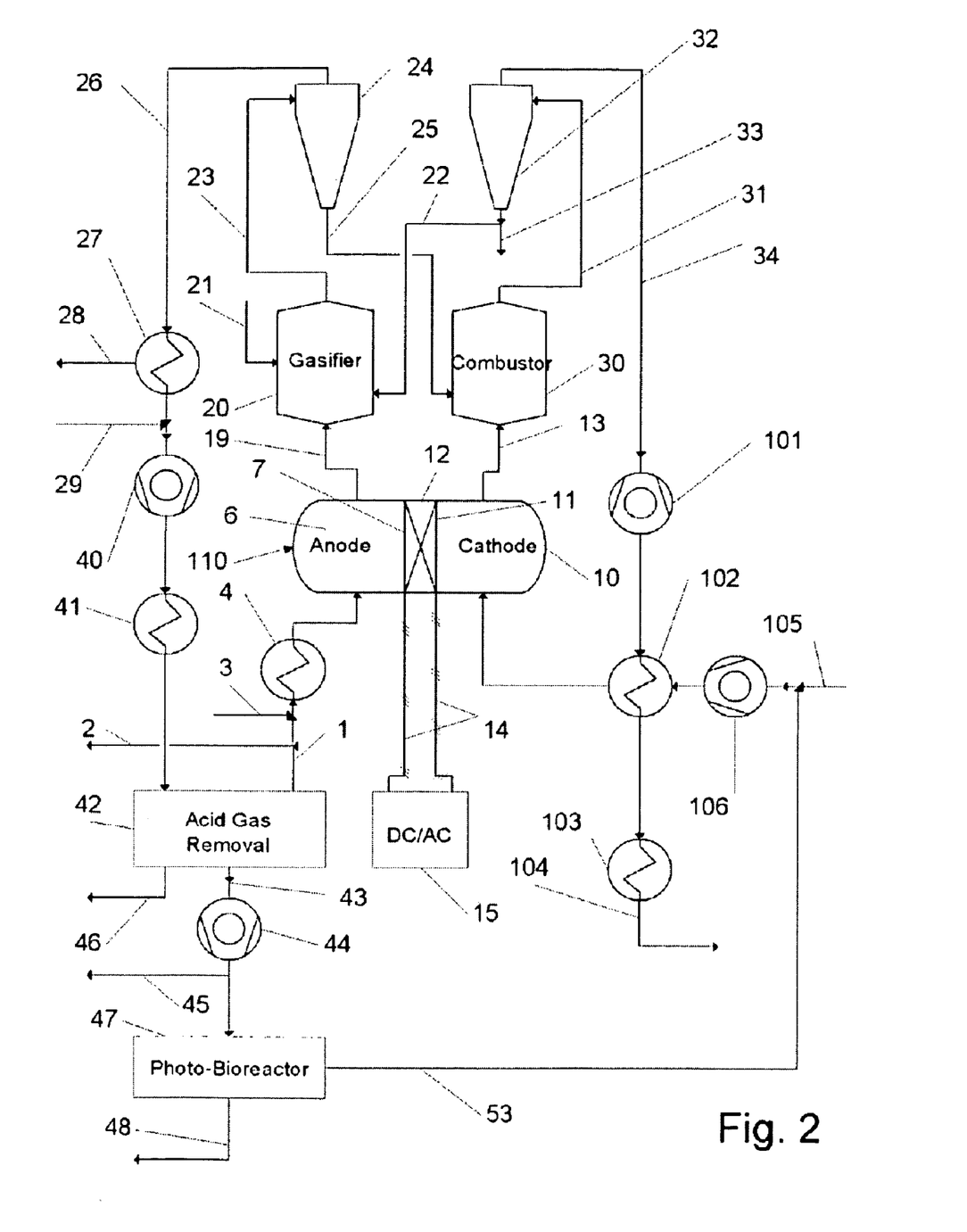
FIG. 2 is a schematic process flow diagram of the second embodiment of the process and system of the present invention. It is a similar process and system except that it substitutes a Solid Oxide fuel cell for the Molten Carbonate Fuel Cell. Oxygen required in the fuel cell and combustor of the gasifier system is supplied by compressing and pre-heating ambient air. The flue gas leaving the gasifier system is expanded through a turbo-expander before pre-heating the combustion air and exhausting out a stack.

This embodiment is shown in FIG. 2. This embodiment is very similar to the preferred embodiment except that ambient air is used as the oxidizer air stream in the cathode and combustor and the Molten Carbonate Fuel Cell 5 has been replaced by a Solid Oxide Fuel Cell 110.

Solid Oxide Fuel cell is described in the background section above. In this embodiment, ambient air is drawn into an Air Compressor 106 through an Air Inlet 105, which can incorporate an air filter and cooler. Pressurized air leaving the air compressor is pre-heated in the Air Pre-Heater 102 to maintain SOFC operating temperature. Hot flue gas leaving the combustor cyclone separator is expanded through a Flue Gas Expander 102 to reduce gas temperature and produce power. This expander can be directly coupled to the air compressor 106 to reduce equipment costs. After leaving the Air Pre-Heater 102, the de-pressurized flue gas passes through a Flue Gas Heat Recovery Unit 103 before exhausting into the atmosphere through a stack 104.

As with the first embodiment, the Photo-Bioreactor system comprising items 47, 48 and 53 on FIG. 2 is optional. If it is incorporated into the design, an oxygen carbon dioxide mixture passes through the Bioreactor Gas Forwarding Line 53 to the inlet of the Air Compressor 106.

This particular embodiment has several advantages over the preferred embodiment. Because air is used as an oxidizer, air separation units or large photo-bioreactors are not needed, reducing plant cost and operational complexity. Because the SOFC does not use carbonate ions as a carrier in the fuel cell, less carbon dioxide enters the acid gas removal system. Acid gas removal systems require about two moles of steam for every mole of carbon dioxide. To remove the carbon dioxide introduced into the fuel gas stream through the fuel cell electrolyte, substantial amounts of steam must be extracted from the steam turbine, significantly reducing power output. Thus, changing MCFC to SOFC significantly reduces steam demand in the acid gas removal system, providing more steam to the condensing section of the steam turbine. cl

DETAILED DESCRIPTION—ADDITIONAL EMBODIMENT (DUAL LOOP PROCESS WITH COMBINED MOLTEN CARBONATE AND SOLID OXIDE FUEL CELLS)

Figure 3:
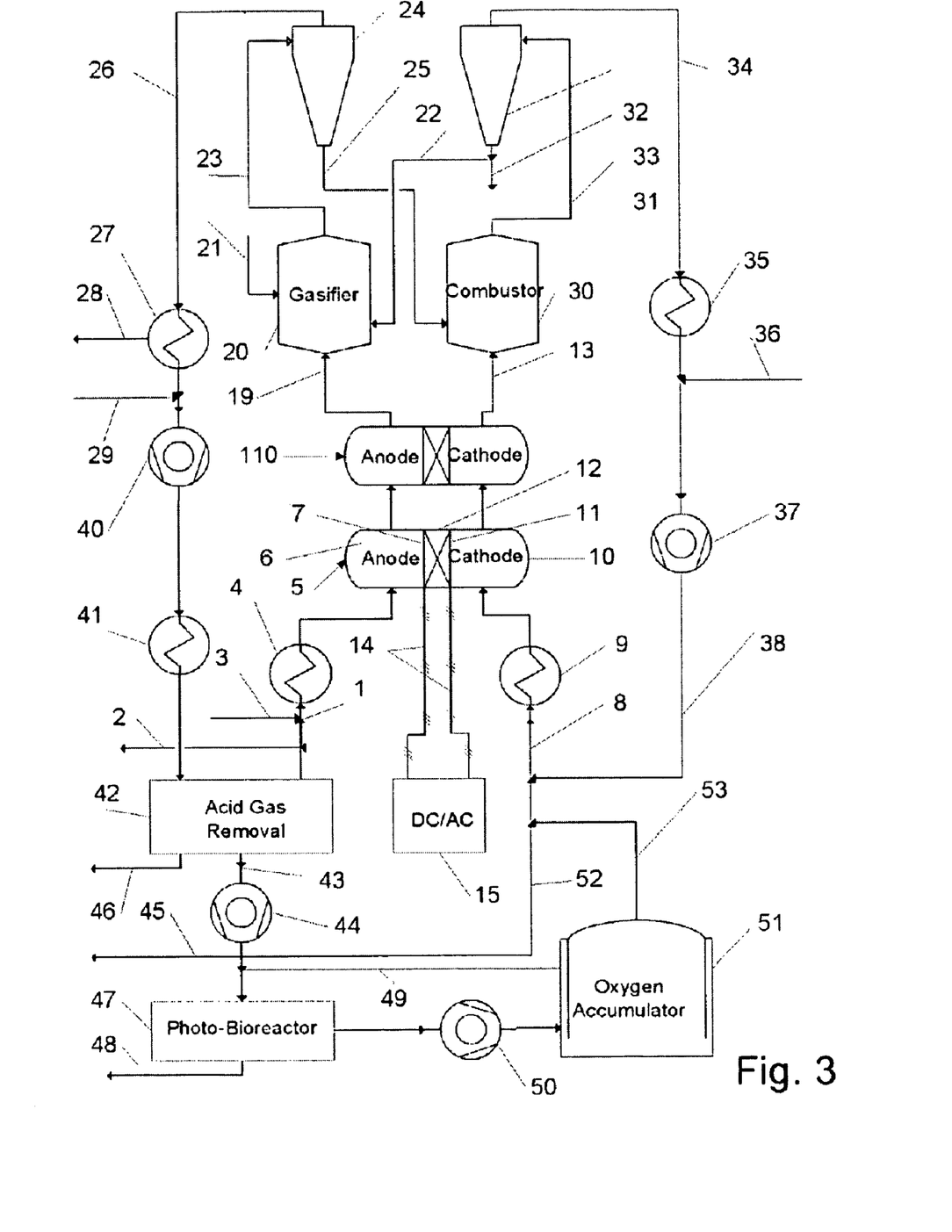
FIG. 3 is a schematic process flow diagram of the third embodiment of the process and system of the present invention. It is similar to the embodiment shown in FIG. 1 except that a MCFC is located upstream of the SOFC. The MCFC is sized just large enough to remove most of the carbon dioxide produced in the combustor located in the gasifier. The SOFC is sized to convert most of the remaining fuel to steam and carbon dioxide. The advantage of this scheme over the embodiment shown in FIG. 1 is that less carbon dioxide needs to be removed from the gas stream in the acid gas removal system, reducing the steam demand of the acid gas removal system.

An additional embodiment of this invention is shown in FIG. 3. This particular embodiment is similar to the preferred embodiment, except that the fuel and oxidizer streams pass through a MCFC 5 first, then a SOFC 110. Most of the electricity is generated in the SOFC. The MCFC is sized to remove carbon dioxide formed in the combustor or leaving the photo-bioreactor 47 through the bioreactor forwarding line 53. This embodiment is an improvement to the preferred embodiment shown in FIG. 1 in that it is not necessary to return carbon dioxide removed from the fuel stream back in the fuel stream to produce power in the fuel cells.

DETAILED DESCRIPTION—ADDITIONAL EMBODIMENT (AIR BLOWN PROCESS WITH HYDRINO STEAM GENERATION OR HYDROGEN EXPORT)

Figure 4:
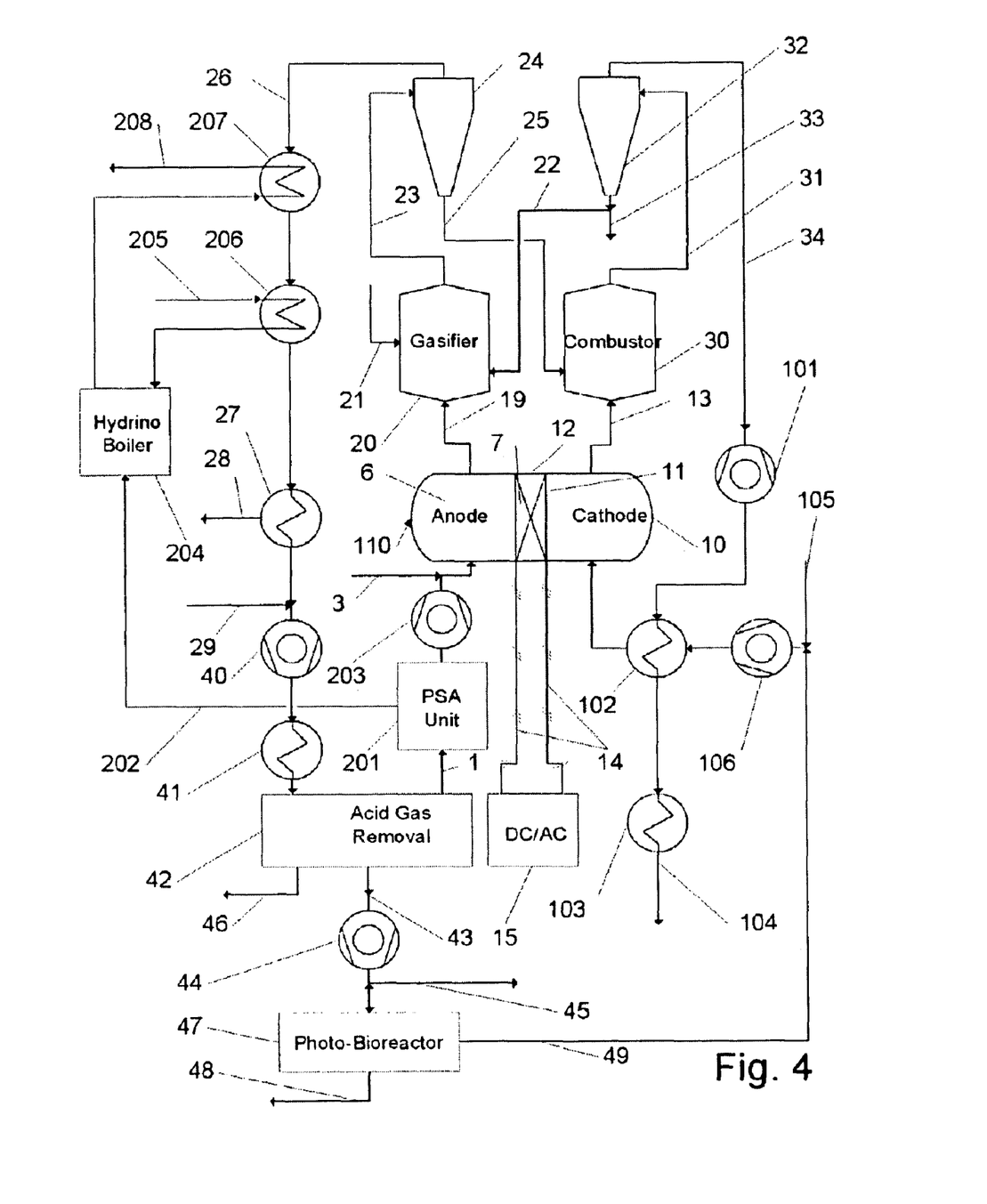
FIG. 4 is a schematic process flow diagram of the fourth embodiment of the process and system of the present invention. This is similar to the second embodiment except that a portion of the hydrogen is removed from the cleaned fuel gas stream and consumed in a boiler, shown in this embodiment as a hydrino boiler. The heat produced from the reaction of the hydrogen produces steam which is further heated in a super-heater heated by fuel gas leaving the gasifier. Before entering the boiler feedwater is also heated in economizers also heated by fuel gas leaving the gasifier.

An additional embodiment of this invention is shown in FIG. 4. This embodiment is similar to the embodiment shown in FIG. 2, except that a substantially pure hydrogen stream is removed from the clean synfuel in the Fuel Gas Supply Line I through a Hydrogen Removal Unit 201. In this particular embodiment, hydrogen is removed through a Pressure-Swing Adsorption (PSA) Unit. Hydrogen passes through the bed, leaving behind the other components of the fuel that are adsorbed on the surface of the bed material. When the vessel containing the bed is depressurized, these components are desorbed and leave the vessel. They then are pressurized by the Tail Gas Compressor 203.

The stream of hydrogen leaves the Hydrogen Removal Unit through a Hydrogen Feed Line 202 which can supply hydrogen to refineries, fuel cells, industrial processes or other uses. In this embodiment, hydrogen is supplied to a Hydrino Boiler 204. In this description the term "Hydrino Boiler" refers to a device which produces heat by moving electrons orbiting hydrogen atoms in ground state orbits to lower orbits, converting the hydrogen atom to a hydrino atom. This process is described in Mills U.S. Pat. No. 6,024,935 Lower Energy Hydrogen Methods and Structures. In this device, heat released by the production of hydrinos is recovered by boiling water.

Demineralized water is supplied to the boiler through a Feedwater Supply Line 206, and is heated by crude syngas in the Syngas Economizer 206 before entering the Hydrino Boiler 204. Steam leaving the Hyrino Boiler is further heated by crude syngas in the Syngas Superheater 207 before leaving the process in the Steam Supply Line 208. This steam can then be used for a variety of uses, including power generation in steam turbines. One particular advantage of this particular arrangement is that the syngas, a sensible heating source (temperature reduced as heat is removed) is used to heat feedwater and steam—both sensible cooling fluids. The hydrinos supply heat to evaporate water, which is a latent cooling source. Because sensible heat is matched to sensible cooling, the temperature of the syngas can closely approach the temperature of the water and steam, resulting in high heat exchanger efficiencies.

DETAILED DESCRIPTION—ADDITONAL EMBODIMENT (AIR BLOWN SOFC PROCESS FOR MSW GASIFICATION WITH NO BIOREACTOR)

An additional embodiment of this invention is described in the paper "The Radovich Cycle: A novel MSW-Fired Cycle" ASME document POWER2009-81188 presented at the ASME Power Conference Jul. 21-23 2009, Albuquerque, N. Mex. This paper is attached to this application and is incorporated by reference in its entirety. This particular embodiment gasifies Municipal Solid Waste (MSW), shifts carbon monoxide to hydrogen using a sour shift catalyst, and removes carbon dioxide in a sulfinol plant. To reduce costs, this design dispenses with the photo-bioreactor and oxygen accumulator; air is used as an oxidant and only passes through the cathode once. To simplify the system and reduce costs, no hydrogen or synfuel gas is exported from this design; virtually all of the fuel recirculates until it is consumed on the fuel cell anode.

DETAILED DESCRIPTION—ADVANTAGES

From the description above of the preferred embodiment (Dual Loop molten carbonate fuel cell) a number of advantages of my system become evident:
a) This process has a higher electrical production efficiency than other comparable coal or bio-mass thermal processes. Higher efficiency results because much of energy in the fuel stream is converted into chemical energy and then directly converted to electrical energy. A conventional solid fuel power plant converts energy in fuel to heat, which is used to produce energy in steam, which then is converted into electrical energy by a steam turbine.
b) The fuel cell performs a number of simultaneous tasks normally performed by different sub-systems: besides producing electrical power, it pre-heats the combustion air and steam used in the TFBSGU, reforms the methane into hydrogen, phase shifts the carbon monoxide to hydrogen, and transfers carbon dioxide from the oxidizer stream to the fuel stream, where it can easily be separated.
c) Reactants enter the two principal processes (fuel cell and Gasifier) close to the reaction temperatures of these processes. As little high temperature heat is consumed in bringing these products to reaction temperature, little energy is destroyed. In addition, the waste heat produced by the fuel cell is directly utilized at the temperature it is generated.
d) As a replacement for an existing coal plant, it will have lower emissions, including lower emissions of greenhouse gases. This occurs because much of the pollutants are trapped in the fuel stream, where they are removed before entering the atmosphere. Because the flue gas is also recycled in this embodiment, flue gas emissions are also eliminated.
e) Most of the carbon dioxide produced by the plant leaves the plant in a pure stream, which can easily be sequestered or processed. The bio-reactor in this embodiment converts carbon dioxide produced by the process into oxygen, which is used by the process, and hydrocarbons, which can consumed as fuel or exported.

f) Supplementary fuel, such as garbage, sewage, wood and harvest waste and perhaps even hazardous wastes can be disposed of in this system. As some of these substances emit methane as they decompose, and methane is a stronger greenhouse gas than carbon dioxide, this process is a net reducer of greenhouse gases, even when releasing all of the carbon dioxide it produces to the atmosphere.

g) Because the fuel gas recirculates at higher than atmospheric pressures, moisture in the stream condenses and releases latent heat at higher temperatures than it would if the moisture was in flue gas at atmospheric pressures. Much of the moisture produced by the process can produce usable export heat as it condenses.

h) This plant not only produces electricity but fuel, oxygen, nitrogen (if an air separation plant is utilized) and chemical byproducts. Chemicals produced by this plant from waste products tend to be more valuable than chemicals produced from waste products in a conventional coal-tired power plant, principally because they are produced reduced rather than an oxidized form.

i) The fuel used by this process does not have to be ground as tine as in competing processes (such as a conventional power plant firing pulverized coal). This reduces the risk of fire and explosion, capital and energy costs, and particulate dust emissions resulting from fuel processing.

From the description above of the second embodiment (Air Blown Solid Oxide Fuel Cell), a number of advantages of my system become evident compared to the first embodiment:

a) Because this fuel cell does not create carbon dioxide in the fuel stream when the fuel reacts with the electrolyte, less carbon dioxide has to be removed from the fuel stream in the acid gas removal system. This reduces the amount of stream needed by the acid gas removal system. This steam is then available to generate electrical power in a steam turbine.

b) This embodiment does not require a photo-bioreactor or air separation unit, minimizing capital cost and reducing auxiliary electrical load.

c) Although this embodiment emits flue gas, unlike the first embodiment, the combustion products leaving the combustor have fewer pollutants than flue gas in conventional power plants burning the same fuels. This is because most of the pollutants are removed in the gasifier.

From the description above of the third embodiment (Dual loop process with combined molten carbonate and solid oxide fuel cells) a number of advantages of my system become evident compared to the other embodiments:

a) The molten carbonate fuel cell is sized to remove most of the carbon dioxide from the oxidizer stream: most of the remaining fuel is consumed by the solid oxide fuel cell. This arrangement minimizes carbon dioxide removal requirements in the acid gas removal system, while still removing carbon dioxide produced in the combustor. This allows a closed loop oxidizer stream with a small acid gas removal system.

From the description above of the fourth embodiment (Air Blown Process with Hydrino Steam Generation or Hydrogen Export) a number of advantages of my system become evident.

a) A large proportion of the hydrogen produced in this plant is exported in a pressurized and relatively pure stream suitable for a wide variety of processes. The remaining gas is consumed in the fuel cell which produces steam and heat to drive the gasification reaction.

b) When the hydrogen is consumed to produce hydrinos and heat, the heat is used mainly to boil water in the hydrino boiler. This allows the temperature curve of the water in the economizer to closely track the temperature curve of the fuel stream; as water is condensing in the fuel stream, it provides the additional duty the economizer needs compared to the superheater.

DETAILED DESCRIPTION—CONCLUSIONS, RAMIFICATIONS, AND SCOPE OF INVENTION

Accordingly, the reader will see that this system can convert carbonaceous material into a variety of useful products, while producing relatively low levels of emissions. While my above description contains many specificities, these should not be construed as limitations on the scope of the invention, but rather as an exemplification of two preferred embodiments thereof.

Many other variations are possible. For example, in the air-blown embodiment shown in FIG. 2, steam can be added to the flue gas (34) to increase the power produced by the expander (101) so that the expander can drive the air compressor (106) using a direct drive. Additional external natural gas can be added to the steam (3) during peaking periods to increase the output of the fuel cells at the expense of lower efficiencies. Heat from collected from solar power collectors can be used to boil water to increase the amount of steam produced by the system. Wind turbine powered air compressors can supply combustion air to the system, supplementing the air compressor (106).

Accordingly, the scope of the invention should be determined not by the embodiment(s) illustrated, but by the appended claims and their legal equivalents.

The invention claimed is:

1. A process for producing electrical and thermal energy from carbonaceous materials, comprising the steps of:

A. providing a solid oxide fuel cell capable of generating electricity which includes an anode and a cathode spaced apart therewithin;

B. passing a stream of an compressed oxidizer material including oxygen into a solid oxide fuel cell cathode compartment to react with the electrons in the cathode to produce oxygen ions to facilitate the generation of electricity;

C. passing a stream of fuel gas into a solid oxide fuel cell anode compartment for reacting thereof with the oxygen ions in the anode to form electrons, carbon dioxide and water vapor therewithin;

D. passing the electrons from the anode to the cathode through an electrical load to produce electrical power;

E. exiting an exhaust stream of unused oxidizer material from the solid oxide fuel cell cathode compartment along with a portion of the waste heat generated within the fuel cell;

F. exiting an exhaust stream of unused fuel gas, carbon dioxide and water vapor material from the solid oxide fuel cell anode compartment along with a portion of the waste heat generated within the solid oxide fuel cell;

G. directing the cathode compartment exhaust stream into a container, referred to as a combustor, for combusting residual carbonaceous material contained therewithin;

H. directing the anode compartment exhaust stream into a container, referred to as a gasifier, for gasifying carbonaceous material contained therewithin;

I. introducing carbonaceous solids, and means of transferring thermal energy into the gasifier, referred to as hot bed material, into the gasifier to react with steam, hydrogen and carbon dioxide contained in the anode compartment exhaust stream to produce a material containing carbon bearing ash, cold bed material, water vapor, carbon dioxide and gaseous hydrocarbons;

J. exiting an exhaust stream of cold bed material, carbon bearing ash, water vapor and carbon dioxide and gaseous hydrocarbons from the gasifier to a container for separating solids, referred to as a gasifier cyclone separator;

K. separating the separating the cold bed material and carbon bearing ash from the gasifier exhaust stream in the gasifier cyclone separator and directing the cold bed material and carbon bearing ash to the combustor;

L. reacting the cold bed material and carbon bearing ash leaving the gasifier cyclone separator with the cathode exhaust stream therewithin the combustor to gasify carbon within the ash and heat the bed material;

M. exiting an exhaust stream of hot bed material, ash and vitiated oxidizer from the combustor to a container for separating solids, referred to as a combustor cyclone separator;

N. separating the hot bed material and ash from the vitiated oxidizer in the combustor cyclone separator and directing the hot bed material and ash to a container referred to as a combustor seal leg;

O. separating hot bed material and ash in the combustor seal leg, then directing the hot bed material to the gasifier;

P. exiting an exhaust stream of vitiated oxidizer from the combustion cyclone separator;

Q. exiting an exhaust stream of water vapor, carbon dioxide, and hydrocarbons from the exhaust stream of the combustion cyclone separator;

R. pressurizing and removing heat, moisture, carbon dioxide and other impurities from at least some of the combustion cyclone separator exhaust stream to allow the gases to be used a fuel in the fuel cell;

S. supplying steam to the fuel cell fuel material to prevent fuel cell fouling and increase reforming operations adjacent to the anode surface of the fuel cell; and T. heating of at least some of the materials initially passing into the fuel cell with the heat removed from the gasifier and from gases exiting the gasifier to increase the efficiency of operation of the fuel cell.

2. A process for producing electrical and thermal energy from carbonaceous materials as defined in claim 1 further comprising directing a portion of the exhaust stream leaving the anode compartment exhaust stream to the inlet of the anode compartment to provide steam to prevent fuel cell fouling and increase the utilization of fuel in the fuel cell.

3. A process for producing electrical and thermal energy from carbonaceous materials as defined in claim 1 further comprising removing heat from the gasifier cyclone separator and combustor cyclone separator exhaust streams and using this recovered heat to form steam to aid in the production of power and thermal energy external to this process.

4. A process for producing electrical and thermal energy from carbonaceous materials as defined in claim 1 further comprising removing heat from the gasifier cyclone separator and combustor cyclone separator exhaust streams and using this recovered heat to heat water to provide thermal energy external to this process.

5. A process for producing electrical and thermal energy from carbonaceous materials as defined in claim 1 further comprising removing heat from the gasifier cyclone separator and combustor cyclone separator exhaust streams and using this recovered heat to dry the carbonaceous material prior to injecting said material into the gasifier.

6. A process for producing electrical and thermal energy from carbonaceous materials as defined in claim 1 further comprising removing heat from the gasifier cyclone separator and combustor cyclone separator exhaust streams and using this recovered heat to regenerate material used to remove carbon dioxide from the gas stream.

7. A process for producing electrical and thermal energy from carbonaceous materials as defined in claim 1 further comprising expanding vitiated oxidizer material leaving the combustor cyclone separator through a means for driving a generator, such as a turbine to produce electrical or shaft power.

8. A process for producing electrical and thermal energy from carbonaceous materials as defined in claim 1 further comprising expanding gases leaving the gasifier cyclone separator through a means for driving a generator, such as a turbine to produce electrical or shaft power.

9. A process for producing electrical and thermal energy from carbonaceous materials as defined in claim 1 wherein additional gaseous hydrocarbon streams external to the process are added to the combustor cyclone separator exhaust stream to produce additional fuel cell power.

10. A process for producing electricity, thermal energy, hydrocarbons and other byproducts from carbonaceous materials as defined in claim 1 further comprising the additional steps of
   A. passing the carbon dioxide removed from the gasifier cyclone separator exhaust to a container containing algae or other chlorophyll-bearing material, referred to as a photo-bioreactor;
   B. passing sunlight or other light energy into the photo-bioreactor to form oxygen and biomass using photosynthesis; and
   C. passing an oxidizer material containing oxygen formed by the photosynthesis process in the bioreactor to the fuel cell cathode space to supply all or some of the oxygen required in the process defined in claim 1.

11. A process for producing electrical and thermal energy as defined in claim 1 further comprising compressing and storing all or a portion the compressed oxidizer material required by the process during off-peak periods to increase electrical outputs during periods of high electrical demand or low electrical supply.

12. A process for producing electricity, hydrocarbons and other byproducts from carbonaceous materials as defined in claim 1 further comprising removing a portion of the hydrocarbons produced in the gasifier for external use.

13. A process for producing electricity, hydrocarbons and thermal energy from carbonaceous materials as defined in claim 12 further comprising removing hydrocarbons to adjust fuel cell output to meet external electrical demand.

14. A process for producing electricity, hydrocarbons and other byproducts from carbonaceous materials as defined in claim 1 further comprising using electricity to produce the oxidizer material in an oxygen plant during periods of low electrical demand, and storing the portion thereof not immediately required by the fuel cell and the gasifier for consumption in the fuel cell and gasifier during period of higher electrical demand.

15. A process for producing electrical and thermal energy from carbonaceous materials, comprising the steps of:

A. providing a molten carbonate fuel cell capable of generating electricity which includes an anode and a cathode spaced apart therewithin;
B. passing a stream of an compressed oxidizer material including oxygen carbon dioxide into a molten carbonate fuel cell cathode compartment to react with the electrons in the cathode to produce carbonate ions to facilitate the generation of electricity;
C. passing a stream of fuel gas into a molten carbonate fuel cell anode compartment for reacting thereof with the carbonate ions in the anode to form electrons, carbon dioxide and water vapor therewithin;
D. passing the electrons from the anode to the cathode through an electrical load to produce electrical power;
E. exiting an exhaust stream of unused oxidizer material from the solid oxide fuel cell cathode compartment along with a portion of the waste heat generated within the fuel cell;
F. exiting an exhaust stream of unused fuel gas, carbon dioxide and water vapor material from the solid oxide fuel cell anode compartment along with a portion of the waste heat generated within the solid oxide fuel cell;
G. directing the cathode compartment exhaust stream into a container, referred to as a combustor, for combusting residual carbonaceous material contained therewithin;
H. directing the anode compartment exhaust stream into a container, referred to as a gasifier, for gasifying carbonaceous material contained therewithin;
I. introducing carbonaceous solids, and means of transferring thermal energy into the gasifier, referred to as hot bed material, into the gasifier to react with steam, hydrogen and carbon dioxide contained in the anode compartment exhaust stream to produce a material containing carbon bearing ash, cold bed material, water vapor, carbon dioxide and gaseous hydrocarbons;
J. exiting an exhaust stream of cold bed material, carbon bearing ash, water vapor and carbon dioxide and gaseous hydrocarbons from the gasifier to a container for separating solids, referred to as a gasifier cyclone separator;
K. separating the separating the cold bed material and carbon bearing ash from the gasifier exhaust stream in the gasifier cyclone separator and directing the cold bed material and carbon bearing ash to the combustor;
L. reacting the cold bed material and carbon bearing ash leaving the gasifier cyclone separator with the cathode exhaust stream therewithin the combustor to gasify carbon within the ash and heat the bed material;
M. exiting an exhaust stream of hot bed material, ash and vitiated oxidizer from the combustor to a container for separating solids, referred to as a combustor cyclone separator;
N. separating the hot bed material and ash from the vitiated oxidizer in the combustor cyclone separator and directing the hot bed material and ash to a container referred to as a combustor seal leg;
O. separating hot bed material and ash in the combustor seal leg, then directing the hot bed material to the gasifier;
P. exiting an exhaust stream of vitiated oxidizer from the combustion cyclone separator;
Q. exiting an exhaust stream of water vapor, carbon dioxide, and hydrocarbons from the exhaust stream of the combustion cyclone separator;
R. pressurizing and removing heat, moisture, carbon dioxide and other impurities from at least some of the combustion cyclone separator exhaust stream to allow the gases to be used a fuel in the fuel cell;
S. supplying steam to the fuel cell fuel material to prevent fuel cell fouling and increase reforming operations adjacent to the anode surface of the fuel cell; and
T. heating of at least some of the materials initially passing into the fuel cell with the heat removed from the gasifier and from gases exiting the gasifier to increase the efficiency of operation of the fuel cell
U. Directing a portion of the carbon dioxide removed from the fuel cell fuel stream to the oxidizer stream to supply carbon dioxide required by the molten carbonate fuel cell.

* * * * *